United States Patent
Simitsis et al.

(10) Patent No.: US 9,262,492 B2
(45) Date of Patent: Feb. 16, 2016

(54) DIVIDING AND COMBINING OPERATIONS

(71) Applicant: Hewlett-Packard Development Company, L.P., Houston, TX (US)

(72) Inventors: Alkiviadis Simitsis, Santa Clara, CA (US); William K. Wilkinson, San Mateo, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 139 days.

(21) Appl. No.: 13/690,086

(22) Filed: Nov. 30, 2012

(65) Prior Publication Data

US 2014/0156589 A1 Jun. 5, 2014

(51) Int. Cl.
*G06F 17/30* (2006.01)

(52) U.S. Cl.
CPC .............................. *G06F 17/30563* (2013.01)

(58) Field of Classification Search
USPC ................................................ 707/600, 602
See application file for complete search history.

(56) References Cited

U.S. PATENT DOCUMENTS

| | | | |
|---|---|---|---|
| 4,916,608 A | 4/1990 | Shultz | |
| 6,820,262 B1 * | 11/2004 | Tellez et al. | 718/106 |
| 7,533,137 B1 * | 5/2009 | Timpanaro-Perrotta | G06F 17/30091 |
| 7,712,657 B1 * | 5/2010 | Block | G06Q 20/1085 235/379 |
| 7,739,267 B2 | 6/2010 | Jin et al. | |
| 8,091,778 B1 * | 1/2012 | Block | G06Q 20/1085 235/379 |
| 8,145,614 B1 * | 3/2012 | Zimran | G06F 17/30132 370/252 |
| 8,201,729 B1 * | 6/2012 | Block | G06Q 20/1085 235/379 |
| 8,280,181 B2 * | 10/2012 | Rai | G06T 5/20 382/260 |
| 8,315,174 B2 * | 11/2012 | Williamson | G06F 17/30592 370/242 |
| 8,539,500 B2 * | 9/2013 | Ghosh | G06F 9/5083 712/234 |
| 2005/0027701 A1 | 2/2005 | Zane et al. | |
| 2007/0214111 A1 | 9/2007 | Jin et al. | |
| 2010/0192145 A1 | 7/2010 | Liles et al. | |
| 2010/0262620 A1 | 10/2010 | Mohan | |

OTHER PUBLICATIONS

Michael Albrecht et al., "Makeflow: A Portable Abstraction for Data Intensive Computing on Clusters, Clouds, and Grids," May 2012, pp. 1-12, Available at: <cse.nd.edu/~ccl/research/papers/makeflow-sweet12-camera.pdf>.
Sankaralingam Panneerselvam and Michael M. Swift, "Dynamic Processors Demand Dynamic Operating Systems," Jun. 2010, pp. 1-7, Available at: <pages.cs.wisc.edu/~swift/papers/dynamicos-hotpar10.pdf>.

* cited by examiner

*Primary Examiner* — Kim Nguyen
(74) *Attorney, Agent, or Firm* — Hewlett Packard Enterprise Patent Department

(57) ABSTRACT

Disclosed herein are techniques for arranging a series of operations. It is determined whether an operation executes more efficiently when divided. It is further determined whether a plurality of operations execute more efficiently when combined.

15 Claims, 9 Drawing Sheets

|  | $e_1$ | $e_2$ | $e_3$ |
|---|---|---|---|
| $o_1$ | X | X |  |
| $o_2$ | ∞ | C1 X | C2 X |
| $o_3$ | X | X | X |
| $o_4$ | X | X |  |
| $o_5$ | X | X |  |

*Fig. 5A*

|       | $e_1$ | $e_2$ | $e_3$ |
|-------|-------|-------|-------|
| $o_1$ | X | X |   |
| $o_2$ |   | X | X |
| $o_{4a}$ | X | X |   |
| $o_3$ | X | X | X |
| $o_{4b}$ | X | X |   |
| $o_5$ | X | X |   |

*Fig. 5C*

DIVIDING AND COMBINING OPERATIONS

BACKGROUND

Many organizations maintain heterogeneous systems of information technology infrastructure comprising assorted data formats originating from multiple sources. For example, an organization may use a data warehouse to manage structured data and a map-reduce engine to manage semi-structured or unstructured data. Data warehouses may provide tools to extract, transform, and load data ("ETL tools"). Some ETL tools permit a user to specify operations that process data from multiple sources or to perform other functions. Such a tool may include a graphical user interface ("GUI") containing an object oriented model of the entities gathered from data sources for ETL processing.

BRIEF DESCRIPTION OF THE DRAWINGS

FIGS. 5A-C are further examples of operation rearrangement in accordance with aspects of the present disclosure.

DETAILED DESCRIPTION

As noted above, ETL tools allow users to specify a sequence of operations that process data from various sources or that perform other types of functions. These tools may also convert each user specified operation into code executable in an execution environment. A user may specify which execution environment to utilize for each operation. However, users may not have enough information to determine the best execution environment to select for each operation. While some operations may be implemented in multiple execution environments, other operations may execute more efficiently in a particular environment. For example, in one operation, a map reduce cluster may be optimal for analyzing log files; in a second operation, standard query language ("SQL") may be optimal for joining the results of the analyses. A user may inadvertently select a suboptimal arrangement of execution environments that may result in sluggish performance of the entire sequence.

In view of the foregoing, disclosed herein are a system, non-transitory computer readable medium and method for rearranging a series of operations specified by a user. In one example, it may be determined whether an operation executes more efficiently when divided. In another example, it may be further determined whether a plurality of operations execute more efficiently when combined. The system, non-transitory computer readable medium, and method disclosed herein may alter an arrangement determined by a user, if a more efficient arrangement could be utilized. Thus, rather than being concerned with the efficiency of a selected arrangement, users may be rest assured that a more efficient arrangement will automatically be produced, if one exists. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
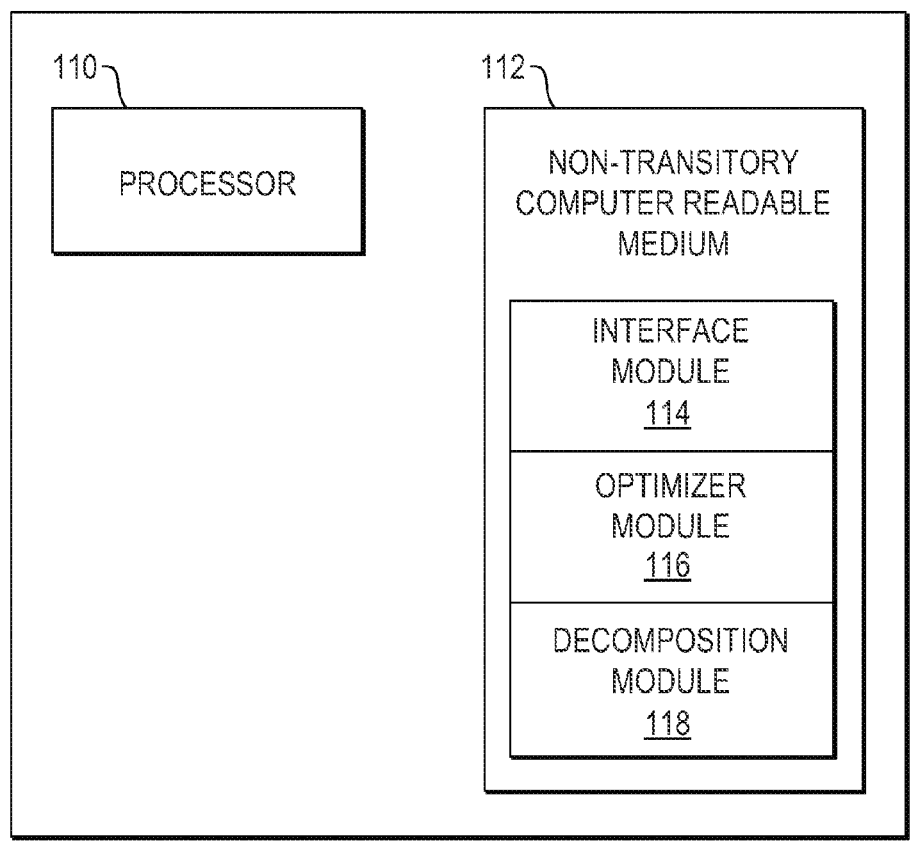
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel ® Corporation. In another example, processor 110 may be an application specific integrated circuit ("ASIC"). Non-transitory computer readable medium ("CRM") 112 may store instructions that may be retrieved and executed by processor 110. The instructions may include an interface module 114, an optimizer module 116, and a decomposition module 118. In one example, non-transitory CRM 112 may be used by or in connection with any instruction execution system that can fetch or obtain the logic from non-transitory CRM 112 and execute the instructions contained therein. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will be described in more detail below, the instructions in interface module 114 may cause processor 110 to display a GUI that permits users to specify a sequence of operations and to request conversion thereof into executable code. Optimizer module 116 may convert each operation into code executable in a selected execution environment. Decomposition module 118 may divide an operation in the sequence into a plurality of sub-operations, when it is determined that the plurality of sub-operations consume fewer resources than the operation. In a further example, decomposition module 118 may also combine a plurality of operations into a single operation, when it is determined that the single operation consumes fewer resources than the plurality of operations.

Determination of resource consumption may be at least partially based on a cost of importing data or exporting data to or from the execution environment selected for the operation. Determination of resource consumption or efficiency may also be at least partially based on a type of data being imported or exported to or from the execution environment. Such considerations may be "data shipping" considerations. In another aspect, determination of resource consumption may be at least partially based on whether the execution environment is optimal for carrying out the operation. An execution environment may be considered optimal for an operation if it can execute that operation more efficiently than any other candidate execution environment. In a further aspect, determination of resource consumption may be at least partially based on whether the operation is a generic operation able to execute efficiently in any available execution environment. These considerations may be "function shipping" considerations. In yet a further example, determination of resources consumed may be at least partially based on a benchmark metric associated with each execution environment.

Figure 2:
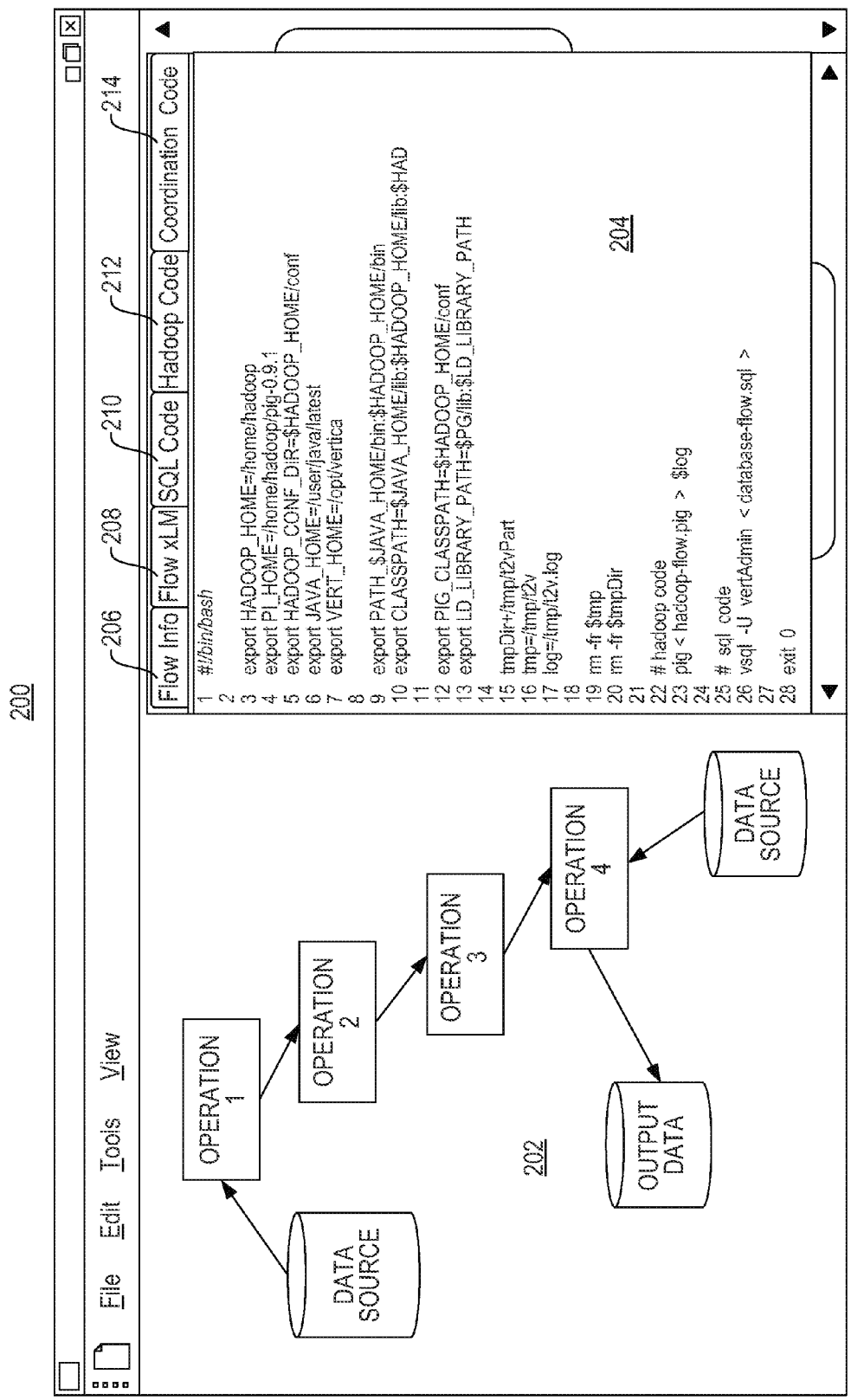
FIG. 2 is a working example of a graphical user interface in accordance with aspects of the present disclosure.

FIG. 2 illustrates an example GUI 200 that may be displayed in accordance with the instructions of interface module 114. The illustrative GUI 200 may have a left panel 202 in which a user may specify a sequence of operations by clicking and dragging icons representative of operations or data sources. In this example, left panel 202 displays four specified operations. Operation one and operation four are each shown having an external data input. Operations two thru four are each shown receiving input from a preceding operation. Operation four is also shown producing a final output of the sequence.

The right panel 204 may display information associated with a tab positioned above the panel. In this example, right panel 204 is currently displaying information associated with coordination tab 214. Upon clicking coordination tab 214, right panel 204 may display executable code that coordinates each operation in the process displayed in left panel 202, when some operations are implemented in different execution environments. A user clicking on flow information tab 206 may cause meta-data associated with the specified operations to be shown in right panel 204. A click on flow information tab 206 may also cause other information to be shown, such as a graph representation of the sequence of operations. A user clicking on xLM tab 208 may cause customized extendable markup language ("XML") code to be displayed in right panel 204. Such code may represent the sequence of operations specified in left panel 202. The "xLM" code may capture information regarding data structures used to implement the sequence of operations (e.g., nodes and edges of a graph or hierarchical tree of interlinked nodes). The "xLM" code may also capture design meta-data (e.g., functional and non-functional requirements or resource allocation). In another example, the "xLM" code may capture operational properties (e.g., operation type, data schema, operation statistics, parameters or expressions for implementing an operation type, or execution environment details). A user clicking on standard query language ("SQL") tab 210 may cause the display of SQL code in right panel 204. Such SQL code may be used to implement some operations in left panel 202. A user clicking on Hadoop tab 212 may cause Hadoop code to be displayed in right panel 204. Decomposition module 118 may determine that an operation specified in left panel 202 should be divided into different execution environments or that a plurality of operations in left panel 202 should be combined into one execution environment. Once the execution environments are selected, GUI 200 may display tabs that permit a user to view or edit the generated code executable therein.

Figure 2A:
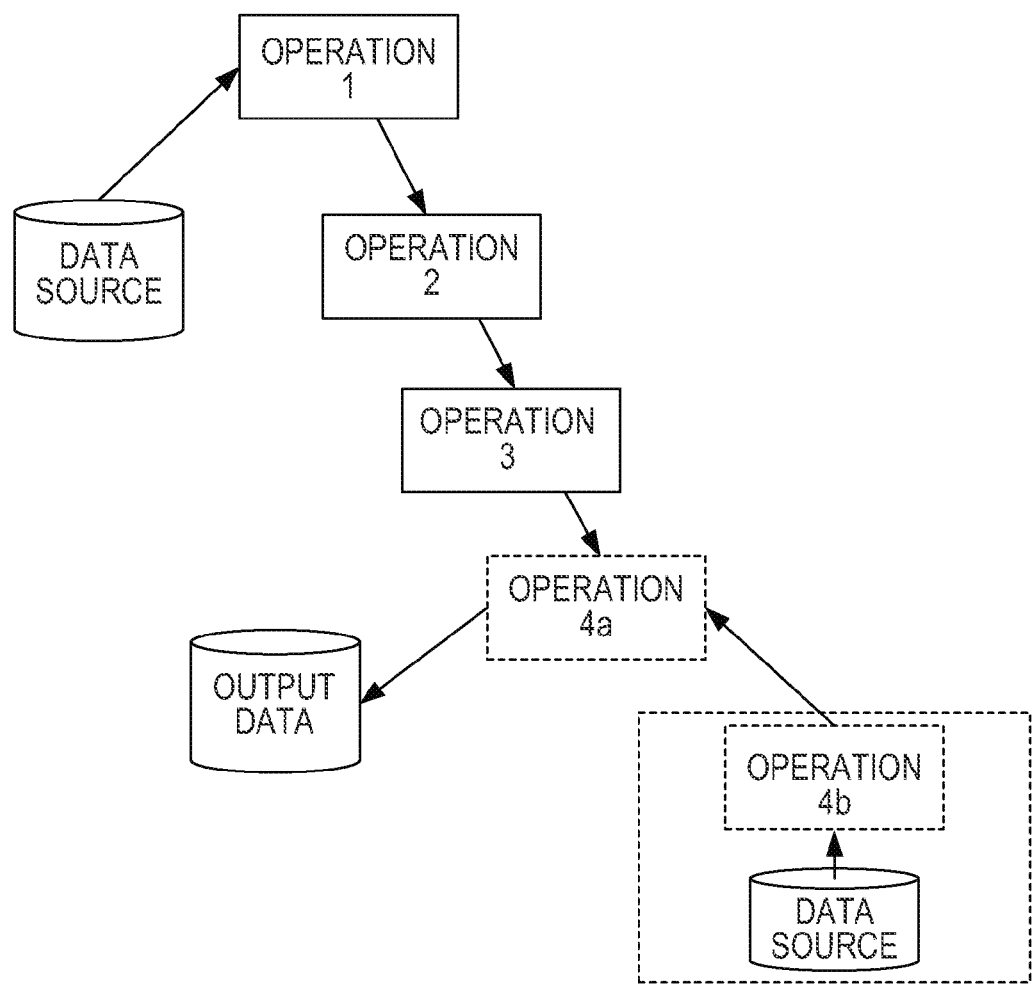
FIG. 2A is a working example of an operation rearrangement in accordance with aspects of the present disclosure.

FIG. 2A illustrates a rearrangement of the operations shown in left panel 202 of FIG. 2. In the example of FIG. 2A, operation four is divided into sub-operations 4a and 4b. Such division may be carried out if it is determined to be more efficient than keeping operation 4 intact. Thus, sub-operation 4a and sub-operation 4b may each execute an aspect of operation 4. Operation 4b is shown executing in the same environment as the data source for operation 4. In this example, decomposition module 118 may have determined that importing data from the data source into the environment of operation 4 was too costly. Thus, the data processing aspects of operation 4 (i.e., sub-operation 4b) may be transferred to the environment of the data source to alleviate this cost. The output of operation 4b may be more efficient to transfer to operation 4a, than it would have been for operation 4 to process the data source itself.

Figure 3:
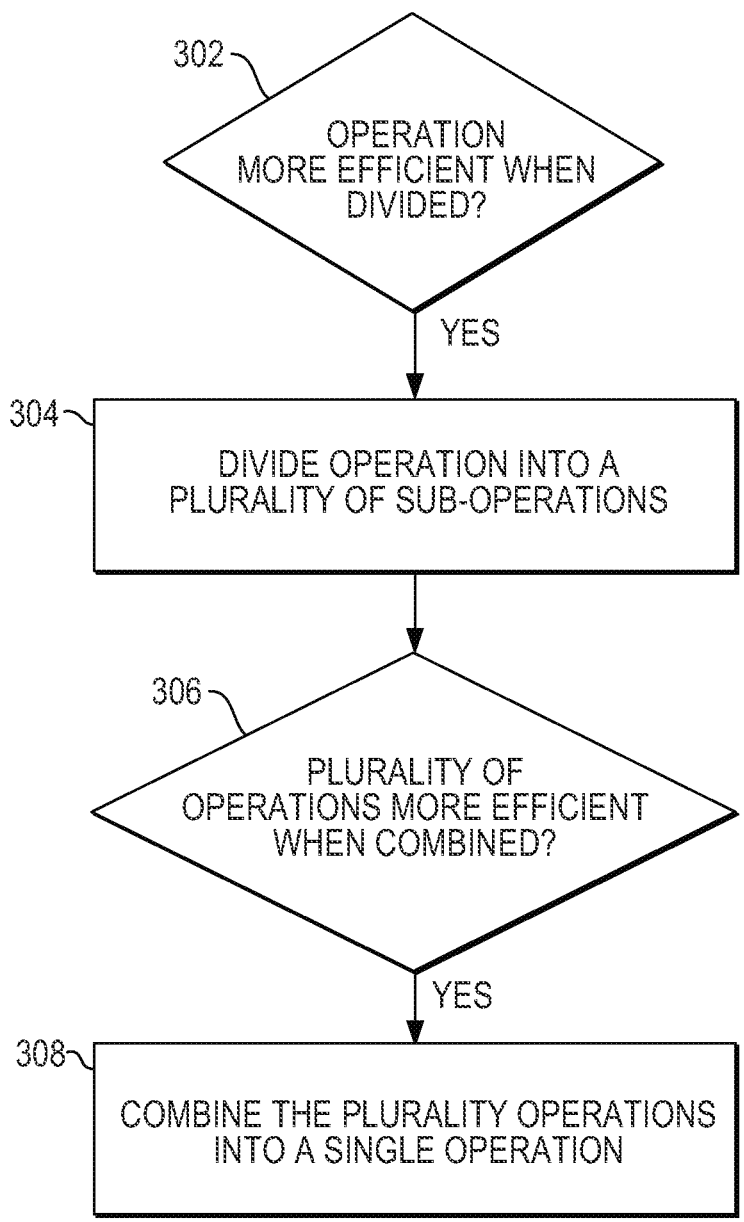
FIG. 3 is a flow diagram of an example method in accordance with aspects of the present disclosure.
Figure 4:
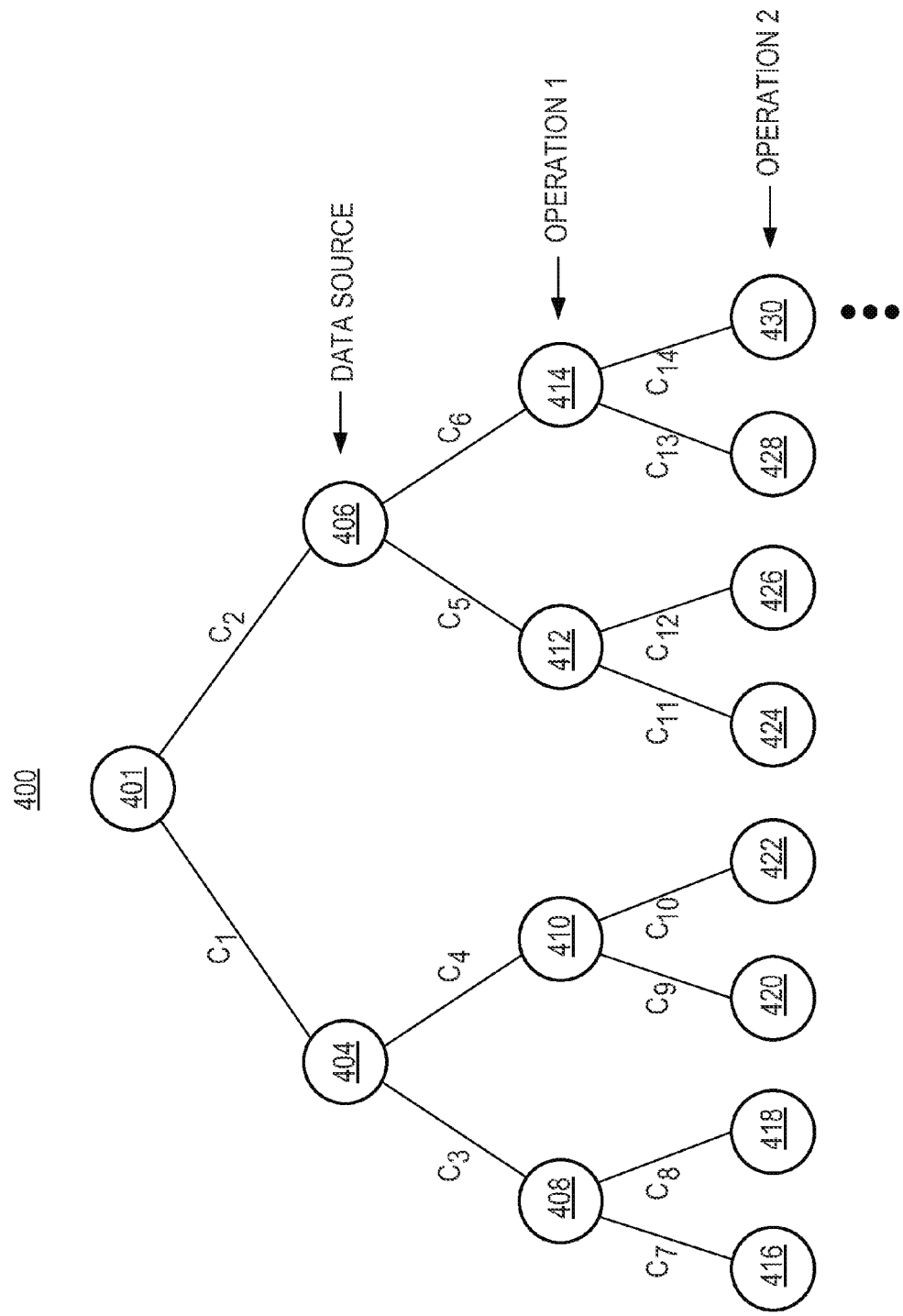
FIG. 4 is an example data structure that may be used for determining whether to divide or combine operations.
Figure 5A:
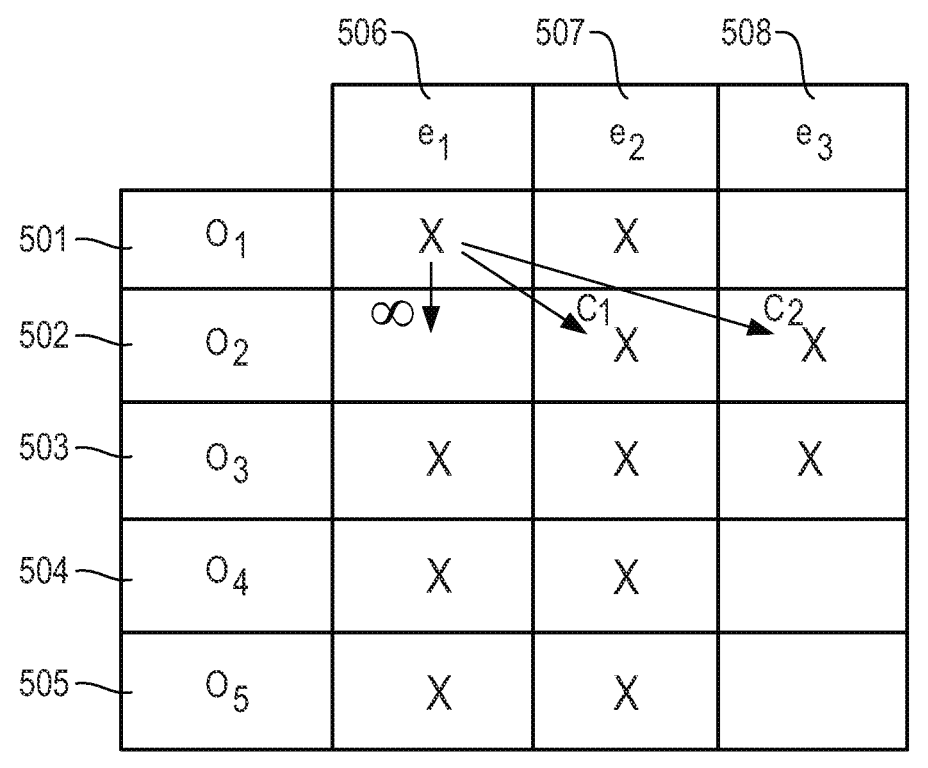
Figure 5B:
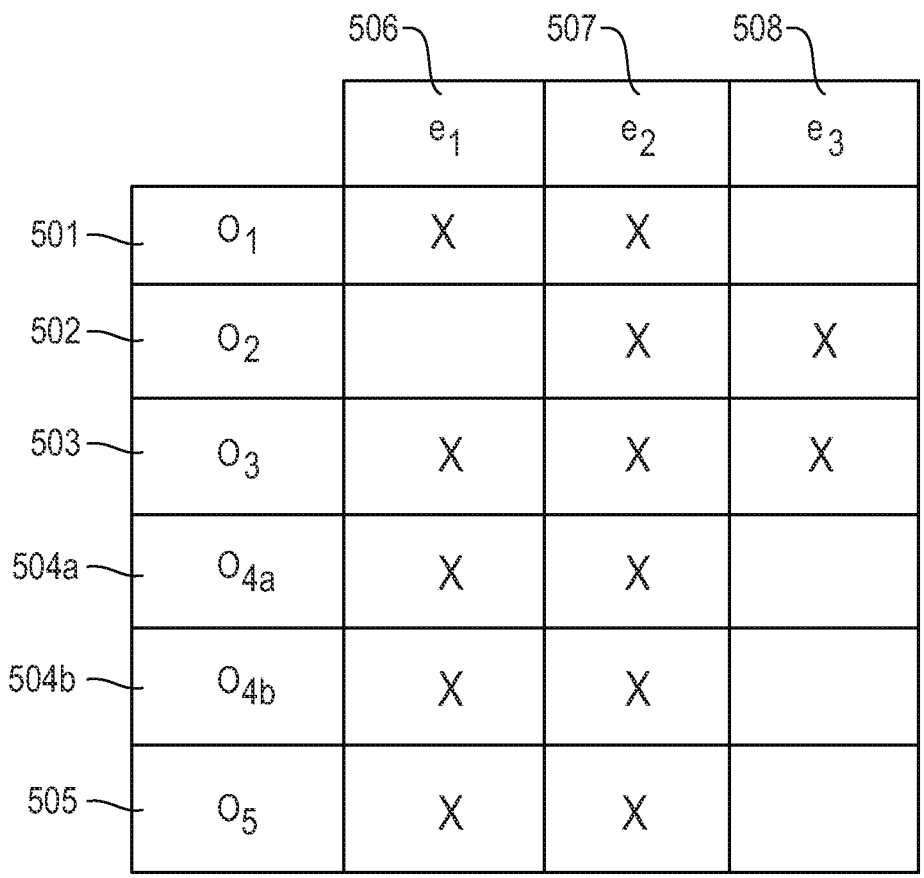
Figure 5C:
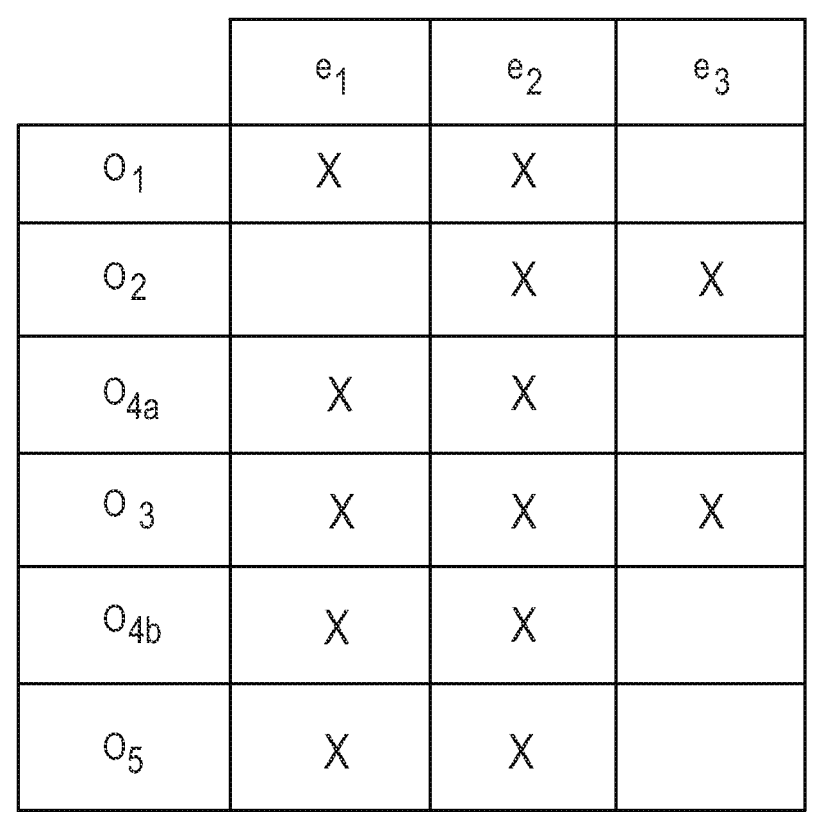
Figure 6:
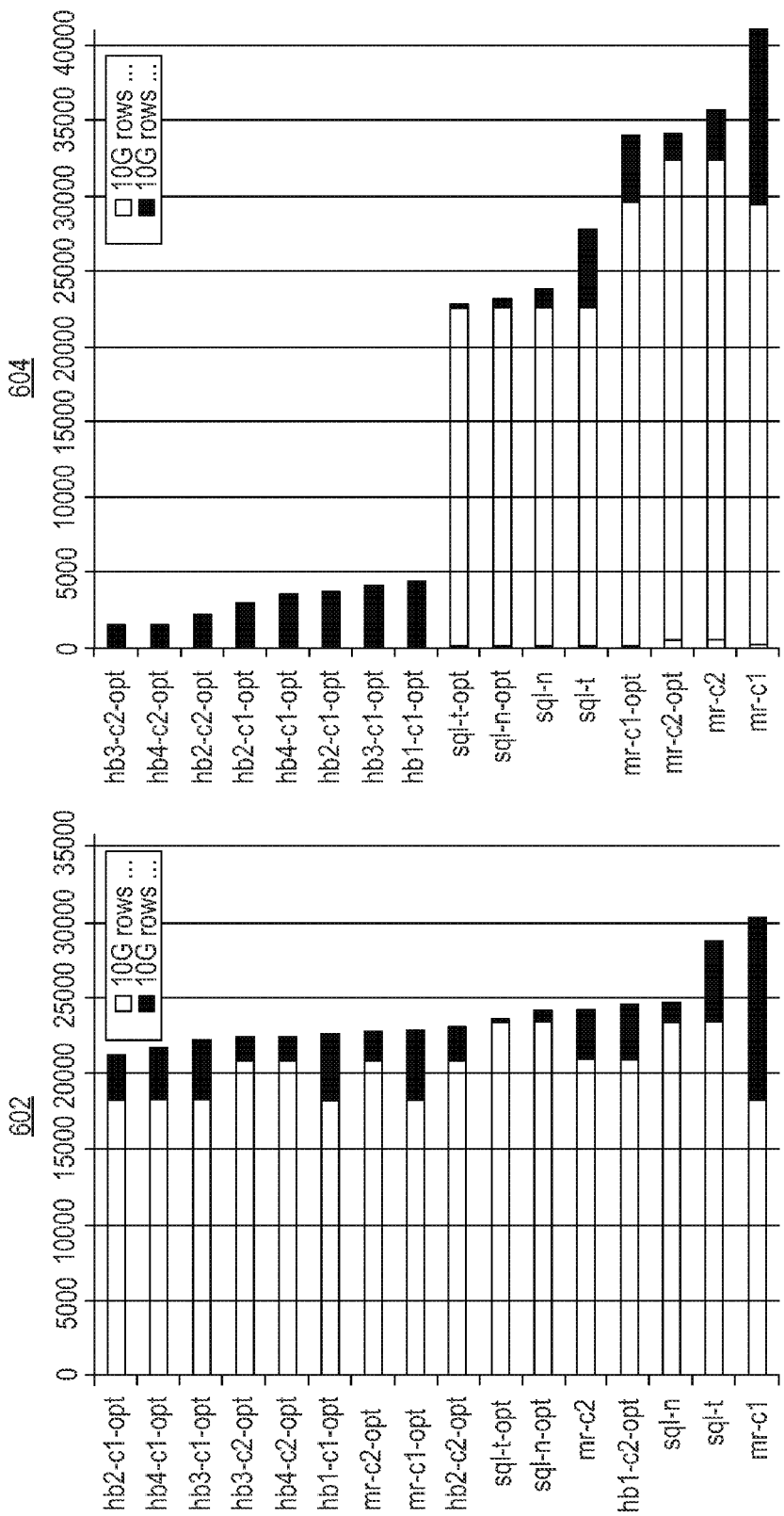
FIG. 6 is a bar graph illustrating the performance of various example execution environments.

Working examples of the system, method, and non-transitory computer-readable medium are shown in FIGS. 3-6. In particular, FIG. 3 illustrates a flow diagram of an example method 300 for dividing or combining operations. FIGS. 4-6 show different working examples in accordance with the techniques disclosed herein.

As shown in block 302 of FIG. 3, it may be determined whether an operation is more efficient when divided. Such a determination may be made upon reading a request to convert a sequence of operations into executable code and determining an execution environment in which to implement each operation. Code executable in the execution environment for each operation may be generated. As shown in block 304, if it is determined that the operation is more efficient when divided, the operation may be divided into a plurality of sub-operations. In block 306, it may be determined whether a plurality of operations is more efficient when combined. If the plurality of operations is more efficient when combined, the plurality of operations may be combined into a single operation, as shown in block 308.

Determination of whether to combine a plurality of operations or divide an operation may be based on a variety of factors. As noted above, in one example, a cost of importing or exporting data to or from the execution environment may be evaluated. A type of data being imported or exported to or from the execution environments may also be evaluated. Furthermore, such determination may be based on a benchmark metric associated with each execution environment. Such benchmark metrics may be derived by executing benchmark programs in each candidate execution environment. Another factor that may be evaluated is whether an execution environment is optimal for the operation. It may also be determined whether an operation is a generic operation able to execute in any execution environment. In this instance, any execution environment may be selected.

FIG. 4 shows an example hierarchical data structure of interlinked nodes that may be used to determine whether to divide or combine an operation. Root node 401 may represent the start of the process and each level in the hierarchical tree may be associated with an operation in the sequence or data processed by an operation. A node in the tree may represent an execution environment that is a candidate for executing the operation corresponding to each level. Alternatively, a node in the tree may represent an execution environment in which a data source may be loaded. In the example of FIG. 4, the first level in the tree represents a data source. Each node in this first level (i.e., nodes 404 and 406) represents an execution environment that is a candidate for storing the type of data corresponding to the first level. Each link associating a pair of nodes in the tree may represent a cost of transitioning between nodes (i.e., the cost of transitioning from one environment to another). The cost may be at least partially based on data shipping and function shipping concerns. For example, the link $C_1$ may partially represent the cost of loading the data into execution environment 404 and $C_2$ may partially represent the cost of loading the data into execution environment 406. Each link may also take into account whether the subsequent execution environment is designed to execute the corresponding operation optimally. A path from the root node to a leaf node may represent a combination of execution environments that may be used to implement the sequence of operations.

The second level in the hierarchical tree of FIG. 4 may represent the first operation in the sequence. Nodes 408, 410, 412, and 414 are shown as candidate environments for executing this first operation. These second level nodes each have a cost associated therewith, namely $C_3$, $C_4$, $C_6$, and $C_6$ respectively. The second operation has eight candidate execution environments (i.e., 416-430) each associated with a cost $C_7$ thru $C_{14}$ respectively. In one example, optimizer module 116 may select the least cost path of interlinked nodes from the root node to a leaf node. Furthermore, decomposition module 118 may combine or divide an operation in the path, if it is determined that doing so is more efficient. Therefore, the path may include different execution environments, may include the same execution environment, or may have more or less execution environments.

FIGS. 5A-C show an example of how execution environments selected by a user may be rearranged. In one example, the matrix data structure shown in FIGS. 5A-C may be generated from a hierarchical tree of interlinked nodes after removing or "pruning" sections of the tree whose aggregate cost exceed a predetermined threshold. In the example of FIG. 5A, each row 501-505 may represent an operation and each column 506-508 may represent a candidate execution environment. Each cell flagged with an "X" may indicate that the execution environment corresponding to the column thereof is a candidate for executing the operation corresponding to a given row. Each arrow projecting from the cell $[e_1, O_1]$ may represent a cost of transitioning from an implementation of $O_1$ in execution environment $e_1$ to an implementation of $C_2$ in another execution environment. The cost of transitioning from $[e_1, O_1]$ to $[e_1, C_2]$ is shown as infinity, since $e_1$ is not a candidate for executing operation $O_2$. However $C_1$ may represent the cost of transitioning from $[e_1, O_1]$ to $[e_2, C_2]$ and $C_2$ may represent the cost of transitioning from $[e_1, O_1]$ to $[e_3, O_2]$.

In the example of FIG. 5B, operation $O_4$ is shown divided into operation $O_{4a}$ and $O_{4b}$. As discussed above, the division may be based on data shipping and function shipping considerations. In the example of FIG. 5B, both environment $e_1$ and $e_2$ may be candidates for executing operation $O_{4a}$, but environment $e_2$ may be deemed optimal for the execution of operation $O_{4a}$. Execution environment $e_1$ and $e_2$ may be candidates for executing operation $O_{4b}$, but environment $e_1$ may be deemed optimal for the execution of operation $O_{4b}$. In the example of FIG. 5O, it may be determined that the overall sequence performs better if $O_{4a}$ executes before $O_3$ and $O_{4b}$.

FIG. 6 depicts two example graphs 602 and 604 that demonstrate the differences in execution times between various example execution environments. Execution environments prefixed with "mr" represent map reduce execution environments; the environments prefixed with "sql" represent SQL execution environments; and, the environments prefixed with "hb" represent a hybrid of different execution environments. These metrics may be benchmark metrics that may be configured as standing data in advance by an administrator. Each bar in graph 602 corresponds to an execution environment, and the length of each bar represents a total time in seconds of executing a sequence of operations on 10 gigabyte rows of data plus the time of loading the data, when executed in a corresponding execution environment. Thus, each bar in graph 602 assumes the data is stored outside the execution environment corresponding to each bar. The white portion of each bar in graph 602 represents the cost of loading the data and the black portion of each bar represents the cost of executing the operations. In graph 604, the length of each bar therein represents a total time in seconds of executing a sequence of operations on 10 gigabyte rows of data plus the time to forward any data to a subsequent execution environment, when the sequence is executed in an environment corresponding to each bar. Thus, each bar in graph 604 assumes the data is stored in a corresponding execution environment and accounts for data forwarded to a subsequent operation. The white portion of each bar in graph 602 represents the cost of forwarding the data and the black portion of each bar represents the cost of executing the operations.

Advantageously, the foregoing system, method, and non-transitory computer readable medium alter a process defined by a user, if it is determined that the altered process is more efficient. Instead of executing an entire process based on a user's limited knowledge, more efficient arrangements may be determined automatically. In this regard, the overall process may be optimized and end users of the resulting process may experience better performance.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
    an interface module which, if executed, instructs at least one processor to permit a sequence of operations to be specified by a user;
    an optimizer module which, if executed, instructs at least one processor to implement each operation in an execution environment and to convert each operation into code executable therein;
    a decomposition module which, if executed, instructs at least one processor to:
        divide an operation in the sequence into a plurality of sub-operations, when it is determined that the execution environment or a plurality of execution environments are optimal to execute the plurality of sub-operations to consume fewer resources than the operation; and
        combine a plurality of operations into a single operation, when it is determined that the execution environment is optimal for carrying out the single operation to consume fewer resources than the plurality of operations.

2. The system of claim 1, wherein to determine whether fewer resources are consumed, the decomposition module, if executed, instructs the processor to determine a cost of importing data or exporting data to or from the execution environment selected for the operation.

3. The system of claim 2, wherein to determine whether fewer resources are consumed, the decomposition module, if executed, instructs the processor to determine a type of data being imported or exported to or from the execution environment.

4. The system of claim 1, wherein to determine whether fewer resources are consumed, the decomposition module, if executed, instructs the processor to determine whether the operation is a generic operation able to execute efficiently in any available execution environment.

5. The system of claim 1, wherein determination of resources consumed may be at least partially based on a benchmark metric associated with each execution environment.

6. A non-transitory computer readable medium having instructions therein which, if executed, cause a processor to:
read a request to convert a sequence of operations into executable code;
determine an execution environment in which to implement each operation;
generate code executable in the execution environment selected for each operation in the sequence;
divide an operation in the sequence into a plurality of sub-operations that are executable in different execution environments, when it is determined that the different execution environments are optimal for carrying out the plurality of sub-operations to execute the operation more efficiently when divided; and
combine a plurality of operations into a single operation executing in a single execution environment, when it is determined that the single execution environment is optimal for carrying out the single operation to execute the plurality of operations more efficiently when combined.

7. The non-transitory computer readable medium of claim 6, wherein the instructions stored therein, if executed, instruct at least one processer to:
evaluate a cost of importing or exporting data to or from each of the different execution environments to determine whether the operation executes more efficiently when divided; and
evaluate a cost of importing or exporting data to or from the single execution environment to determine whether the plurality of operations execute more efficiently when combined.

8. The non-transitory computer readable medium of claim 7, wherein the instructions stored therein, if executed, instruct at least one processer to:
evaluate a type of data being imported or exported to or from each of the different execution environments to determine whether the operation executes more efficiently when divided; and
evaluate a type of data being imported or exported to or from the single execution environment to determine whether the plurality of operations execute more efficiently when combined.

9. The non-transitory computer readable medium of claim 6, wherein the instructions stored therein, if executed, instruct at least one processor to evaluate whether the operation and the plurality of operations are generic operations able to execute efficiently in any available execution environment.

10. The non-transitory computer readable medium of claim 6, wherein the instructions stored therein, if executed, instruct at least one processor to:
evaluate a benchmark metric associated with each of the different execution environments to determine whether the operation executes more efficiently when divided; and
evaluate a benchmark metric associated with the single execution environment to determine whether the plurality of operations execute more efficiently when combined.

11. A method comprising:
displaying, using at least one processor, an interface that allows a user to specify a series of operations associated with data;
reading, using at least one processor, a request from the user via the interface to convert a sequence of operations into executable code;
selecting, using at least one processor, an execution environment in which to implement each operation in the sequence;
dividing, using at least one processor, an operation in the sequence into a plurality of sub-operations executable in different execution environments, when it is determined that the different execution environments are optimal for carrying out the sub-operations to execute the operation more efficiently when divided into the plurality of sub-operations; and
combining, using at least one processor, a plurality of operations into a single operation executing in a single execution environment, when it is determined that the single execution environment is optimal for carrying out the single operation to execute the plurality of operations more efficiently when combined into the single operation.

12. The method of claim 11, wherein determining whether the operation executes more efficiently when divided comprises, determining, using at least one processor, a cost of importing or exporting data to or from each of the different execution environments; and
wherein determining whether the plurality of operations execute more efficiently when combined comprises determining, using at least one processor, a cost of importing or exporting data to or from the single execution environment.

13. The method of claim 12, wherein determining whether the operation executes more efficiently when divided comprises, determining, using at least one processor, a type of data being imported or exported to or from each of the different execution environments; and
wherein determining whether the plurality of operations execute more efficiently when combined comprises determining, using at least one processor, a type of data being imported to or from the single execution environment.

14. The method of claim 11, wherein dividing the operation and combining the plurality of operations comprises, determining, using at least one processor, whether the operation and the plurality of operations are generic operations able to execute efficiently in any available execution environment.

15. The method of claim 11, wherein determining whether the operation executes more efficiently when divided comprises, evaluating, using at least one processor, a benchmark metric associated with each of the different execution environments to determine whether the operation executes more efficiently when divided; and wherein determining whether the plurality of operations execute more efficiently when combined comprises evaluating, using at least one processor, a benchmark metric associated with the single execution environment to determine whether the plurality of operations execute more efficiently when combined.

\* \* \* \* \*

UNITED STATES PATENT AND TRADEMARK OFFICE
CERTIFICATE OF CORRECTION

PATENT NO. : 9,262,492 B2
APPLICATION NO. : 13/690086
DATED : February 16, 2016
INVENTOR(S) : Alkiviadis Simitsis et al.

Page 1 of 1

It is certified that error appears in the above-identified patent and that said Letters Patent is hereby corrected as shown below:

In the claims,

In column 7, line 45, in Claim 7, delete "processer" and insert -- processor --, therefor.

In column 7, line 56, in Claim 8, delete "processer" and insert -- processor --, therefor.

Signed and Sealed this
Fourteenth Day of June, 2016

Michelle K. Lee
*Director of the United States Patent and Trademark Office*